US006432526B1

(12) United States Patent
Arney et al.

(10) Patent No.: US 6,432,526 B1
(45) Date of Patent: Aug. 13, 2002

(54) NANOSIZE METAL OXIDE PARTICLES FOR PRODUCING TRANSPARENT METAL OXIDE COLLOIDS AND CERAMERS

(75) Inventors: David S. Arney, St. Paul; Thomas E. Wood, Stillwater, both of MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/992,713

(22) Filed: Nov. 19, 2001

Related U.S. Application Data

(62) Division of application No. 09/319,057, filed on May 27, 1999, now Pat. No. 6,329,058.

(51) Int. Cl.$^7$ ................................................. B32B 5/16
(52) U.S. Cl. ........................ 428/328; 428/332; 428/338; 428/339
(58) Field of Search ................................ 428/328, 332, 428/338, 339

(56) References Cited

U.S. PATENT DOCUMENTS

| 3,793,293 A | 2/1974 | Ray-Chaudhuri et al. |
| 3,845,022 A | 10/1974 | Ray-Chaudhuri et al. |

(List continued on next page.)

FOREIGN PATENT DOCUMENTS

| CA | 2190436 | 5/1997 |
| EP | 0 314 166 A1 | 5/1989 |
| EP | 0 337 695 A2 | 10/1989 |
| EP | 0 526 975 A2 | 2/1993 |
| EP | 0 581 216 A1 | 2/1994 |
| EP | 0 688 834 A1 | 12/1995 |
| EP | 0 791 636 A1 | 8/1997 |
| FR | 2 682 389 | 4/1993 |
| GB | 2 089 826 | 6/1982 |
| WO | WO 93/05875 | 4/1993 |
| WO | WO 963157 | 10/1996 |

OTHER PUBLICATIONS

"Rutile Formation in Hydrothermally Crystallized Nano-sized Titania", Bacsa and Gratzel, J. Am. Ceram. Soc., vol. 79, 1996, pp. 2185–2188.
"Crystallization Behavior and Microstructure of Hydrothermally Treated Monodispersed Titanium Dioxide Particles", Kondo et al., Journal of the Ceramic Society of Japan, vol. 102, 1994, pp. 742–746.
Patent Abstracts of Japan Patent No. 02 278125 A, vol. 15, No. 41, Jan. 31, 1991.
"Generation of wet–chemical AR–coatings on plastic substrates by use of polymerizable nanopticles", P.W. Oliveria et al., SPIE, vol. 3136, pp. 452–461.
TiO2, nano–particle–dispersed polyimide composite optical waveguide materials through reverse micelles, M. Yoshida et al., Journal of Materials Science, vol. 32, 1997 pp. 4047–4051.
"Phase Transformation Behavior at Low Temperature in Hydrothermal Treatment of Stable and Unstable Titania Sol", Won Wook So, et al., Journal of colloid and Interface Science, vol. 191, pp. 398–406.
"Synthesis of Peroxo–Modified Anatase Sol from Peroxo Titanic Acid Solution", Ichinose et al., Journal of the Ceramic Society of Japan, vol. 104, 1996, pp. 715–718.

*Primary Examiner*—Hoa T. Le
(74) *Attorney, Agent, or Firm*—Scott R. Pribnow

(57) ABSTRACT

The present invention relates to metal oxide particles capable of being highly dispersed in organic materials to form transparent colloids and ceramers. The metal oxide particles of the present invention have surfaces attached to a dispersing aid and a degree of crystallinity of greater than 55 percent. The crystallite diameter of the metal oxide particles is greater than about 4 nanometers and less than about 20 nanometers. The present invention also relates to the colloids and ceramers prepared using these metal oxide particles and the methods associated with the preparation of the particles, colloids, and ceramers.

21 Claims, 3 Drawing Sheets

U.S. PATENT DOCUMENTS

| | | |
|---|---|---|
| 3,932,181 A | 1/1976 | Ray-Chaudhuri et al. |
| 4,438,190 A | 3/1984 | Ishimaru et al. |
| 4,478,876 A | 10/1984 | Chung |
| 4,487,904 A | 12/1984 | Fukuda et al. |
| 4,493,233 A | 1/1985 | Dusel et al. |
| 4,885,322 A | 12/1989 | Kurimoto et al. |
| 4,931,523 A | 6/1990 | Watanabe et al. |
| 5,002,795 A | 3/1991 | Keough |
| 5,049,371 A | 9/1991 | Rinn et al. |
| 5,104,929 A | 4/1992 | Bilkadi |
| 5,116,644 A | 5/1992 | Asai et al. |
| 5,143,988 A | 9/1992 | Wang et al. |
| 5,371,796 A | 12/1994 | Wellinghoff |
| 5,391,210 A | 2/1995 | Bilkadi et al. |
| 5,403,513 A | 4/1995 | Sato et al. |
| 5,470,910 A | 11/1995 | Spanhel et al. |
| 5,494,949 A | 2/1996 | Kinkel et al. |
| 5,654,090 A | 8/1997 | Kayanoki |
| 5,698,309 A | 12/1997 | Dallmann et al. |
| 5,720,805 A | 2/1998 | Wellinghoff et al. |
| 5,821,186 A | 10/1998 | Collins |
| 5,922,500 A | 7/1999 | Iida et al. |

NANOSIZE METAL OXIDE PARTICLES FOR PRODUCING TRANSPARENT METAL OXIDE COLLOIDS AND CERAMERS

This is a divisional of application Ser. No. 09/319,057, filed May 27, 1999 now U.S. Pat. No. 6,329,058.

TECHNICAL FIELD

The present invention relates to organic matrixes containing dispersed high refractive index nanosize metal oxide particles, and to processes of making nanosize titanium-based oxide particles which, in part, may be used to increase the refractive indexes of transparent organic matrixes.

BACKGROUND

Some optical applications require transparent materials having high refractive indexes. Polymers with refractive indexes less than that required for certain optical applications may be utilized if modified by partial substitution of atoms, such as bromide or sulfur, for hydrogen or oxygen in the polymers. Such substituted polymers typically have increased refractive indexes but are often undesirably colored and lack thermal and photochemical stability. Therefore, these substituted polymers may not be the best choice for certain optical applications.

An alternative method of increasing the refractive indexes of polymers is combining metal oxide particles with polymers to form ceramers. Ceramers may be defined as hardened or cured compositions having ceramic particles embedded or grafted into the polymer matrixes and typically having optical and physical characteristics intermediate between those of the metal oxide and the organic component. Transparency of ceramers is dependent upon, in part, the sizes and refractive indexes of the metal oxide particles contained therein. If the metal oxide particles used in ceramer preparations have large mean diameters, the transparency of the ceramers may be diminished. Light directed at the ceramer containing large metal oxide particles would be reflected back to the light source or deflected to the side, reducing the apparent transparency of the ceramer. Moreover, the transparency of the ceramer may be diminished upon the addition of very small metal oxide particles, if the particles agglomerate within the polymer. These particle agglomerates act as larger particles that may scatter or reflect light. In addition, during the preparation of ceramers, metal oxide particles may precipitate creating what appears to be separate layers(s) that have less than maximal transparency. For a transparent ceramer, the small metal oxide particles must be highly dispersed (non-agglomerated) in the polymer to avoid light scattering.

One method of ceramer preparation is to treat metal oxide particles with specific organic acids, or other surface active agents, before combining the metal oxide particles with polymer precursors. It is through that surface-active agents coat the surface of the metal oxide particles and create an organophilic interface with the polymer compositions. An adsorbed organic layer on the outside of the metal oxide particles sterically inhibits agglomeration resulting in greater metal oxide particle dispersion stability. Another method of increasing the dispersibility of metal oxides in polymer compositions is to electrostatically stabilize the metal oxide particles by forming aqueous colloids. The electrostatically charged layer surrounding the metal oxide particles provides repulsive forces between metal oxide particles inhibiting agglomeration. These methods of dispersing metal oxides are not perfect. Consequently, transparent polymer/metal oxide compositions having high refractive indexes are desirable but difficult to obtain because the metal oxide particles, when combined with polymer precursors, may agglomerate and decrease the transparency of the resulting ceramers.

The refractive indexes of ceramers or ceramer compositions are, in part, dependent upon the refractive indexes of the metal oxide particles added to the organic matrix. The theoretical refractive index of a single ceramer can only be as high as the volume weighted average of the refractive indexes of the metal oxide particles and the polymer matrix. Consequently, it is desirable to make ceramers using metal oxide particles having high refractive indexes. Metal oxide particles in crystalline form typically have higher refractive indexes than metal oxide particles that are amorphous (that is, non-crystalline). Therefore, using crystalline metal oxides to make ceramers is desirable, though highly crystalline metal oxide particles that are dispersible are difficult to make because of their tendency to agglomerate in polymer compositions. Generally for a given particle size, the tendency to flocculate increases with increasing refractive index of the particles. For most high refractive index oxides, the form that is precipitated from solution is usually an amorphous or lower refractive index form. Treatments to induce crystallization (for example, heating at an elevated temperature) often tend to induce flocculation or agglomeration of the metal oxide particles. Heating also tends to induce sintering of aggregated of primary particles, especially very small particles that have very high surface areas and thus higher total surface energies. Because of its high dielectric constant, water is an excellent medium for crystallizing and stabilizing metal oxide particles. However, metal oxide particles that are formed in water are difficult to transfer into organic liquids without particle agglomeration and concomitant transfer of water.

SUMMARY OF THE INVENTION

The present invention embodies metal oxide particles that may be combined with transparent polymer compositions without substantially diminishing the transparency of the ceramer compositions or ceramers produced. The metal oxide particles have dispersing aid attached thereto and have a degree of crystallinity of greater than about 55 percent. The metal oxide particles also have a particle size, or crystallite diameter, greater than about 4 nanometers and less than about 20 nanometers, and an absorptivity of less than 3.00 as an organic colloid. The metal oxide particles are preferably titanium-based particles.

The present invention embodies transparent ceramers and ceramer compositions comprising metal oxide particles of the present invention dispersed in an organic matrix. The transparent ceramers of the present invention typically have a refractive index greater than about 1.6. The organic matrix of the ceramer is preferably prepared from polymer precursors selected from the group consisting of molecules possessing ethylenically unsaturated polymerizable functionality and combinations thereof.

The present invention embodies colloids including the metal oxide particles of the present invention having dispersing aid attached thereto dispersed in an organic liquid. These colloids are substantially free of particle agglomeration and of water.

The present invention embodies coated articles having a substrate with a surface attached to a coating. The substrate, the coating, or both may comprise a ceramer of the present invention. The substrate and coating may comprise the same ceramers or different ceramers.

The present invention embodies a process of making dispersible crystalline metal oxide nanoparticles. The process includes (a) providing metal alkoxides, and (b) reacting the metal alkoxides with a substiochiometric amount of a complexing agent including a carboxylic acid having a carbon chain of about 3 carbon atoms to about 18 carbon atoms. The process also includes the steps of partially hydrolyzing the product of step (b) in step (c) by the addition of substoichiometric amounts of water and (d) thermally treating the partially hydrolyzed mixture by heating under pressure at a temperature in the range of about 150° C. to about 265° C. for an amount of time sufficient to form crystalline particles having a degree of crystallinity greater than about 50 percent and less than about 86 percent. Typically the partially hydrolyzed mixture is thermally treated under 18 atmospheres to 40 atmospheres of pressure.

As used herein, with respect to the present invention, the following shall apply:

"Absorptivity" refers to the inhibition of light transmission by scattering or light absorption. Absorptivity as used here is measured by an absorptivity test procedure described below.

"Autogenous" refers to self-generated. For example, autogenous pressure results when a vessel is sealed at atmospheric pressure and then heated. The components within the vessel volatilize and form gas within the vessel increasing the pressure within the vessel.

"Ceramer" refers to a ceramer composition in which a curable composition is cured to form a solid, substantially non-flowing material.

"Ceramer composition" refers to a coatable dispersion comprising substantially non-aggregated, colloidal inorganic oxide particles dispersed in a curable organic binder composition, wherein curing of the binder is understood to mean in a board sense the process of solidification (hardening) of the binder brought about by a suitable method such as cooling of a molten thermoplastic material, drying of a solvent-containing composition, chemical crosslinking of a thermosetting composition, radiation curing of a radiation curable composition, or the like.

"Colloid" refers to a stabilized dispersion of metal oxide particles in a liquid.

"Coupling agent" refers to an organic composition having a first functional group capable of covalent or ionic bonding to a metal oxide particle, a second functional group capable of reacting with an organic precursor and optionally a hydrophobic segment located between the first and second functional groups.

"Curable" means that a coatable material can be transformed into a solid, substantially non-flowing material by means of cooling (to solidity hot melts), heating (to dry and solidify materials in a solvent), chemical crosslinking, radiation crosslinking, or the like.

"Discrete" refers to non-agglomerated primary particles.

"Dispersant or Dispersing Aid" refers to an organic composition having a first functional group capable of covalent or ionic bonding to a metal oxide particle and a hydrophobic segment. The term dispersant or dispersing aid includes coupling agent(s) that have a second functional group.

"Organophilic" refers to dispersible in non-polar organic solvent.

"Seed" refers to preexisting particle(s) utilized as a growth site to form a colloidal particle by precipitation.

"Substiochiometric amount" refers to 2 moles of water of less added per mole of metal atoms in metal alkoxide. In case of titanium alkoxide, $(Ti(OR)_4$, a substiochiometric amount of water would be less than 2 moles of water per mole of titanium.

"Titanium based oxide particles" refers to metal oxide particles comprising an oxygen anion lattice wherein greater than or equal to 33 mole percent of the cations in the metal oxide are titanium cations.

"Thermally treating" refers to the process of making the metal oxide particles of the present invention in which the process includes heating the partially hydrolyzed metal alkoxide under pressure.

"Uniform" refers to a narrow distribution of particle sizes of the metal oxide particles as measured by light scattering or transmission electron microscopy. The metal oxide particles of the present invention are uniform in that they have a particle size typically greater than 4 nanometers and smaller than 15 nanometers.

DETAILED DESCRIPTION OF THE INVENTION

Figure 1:
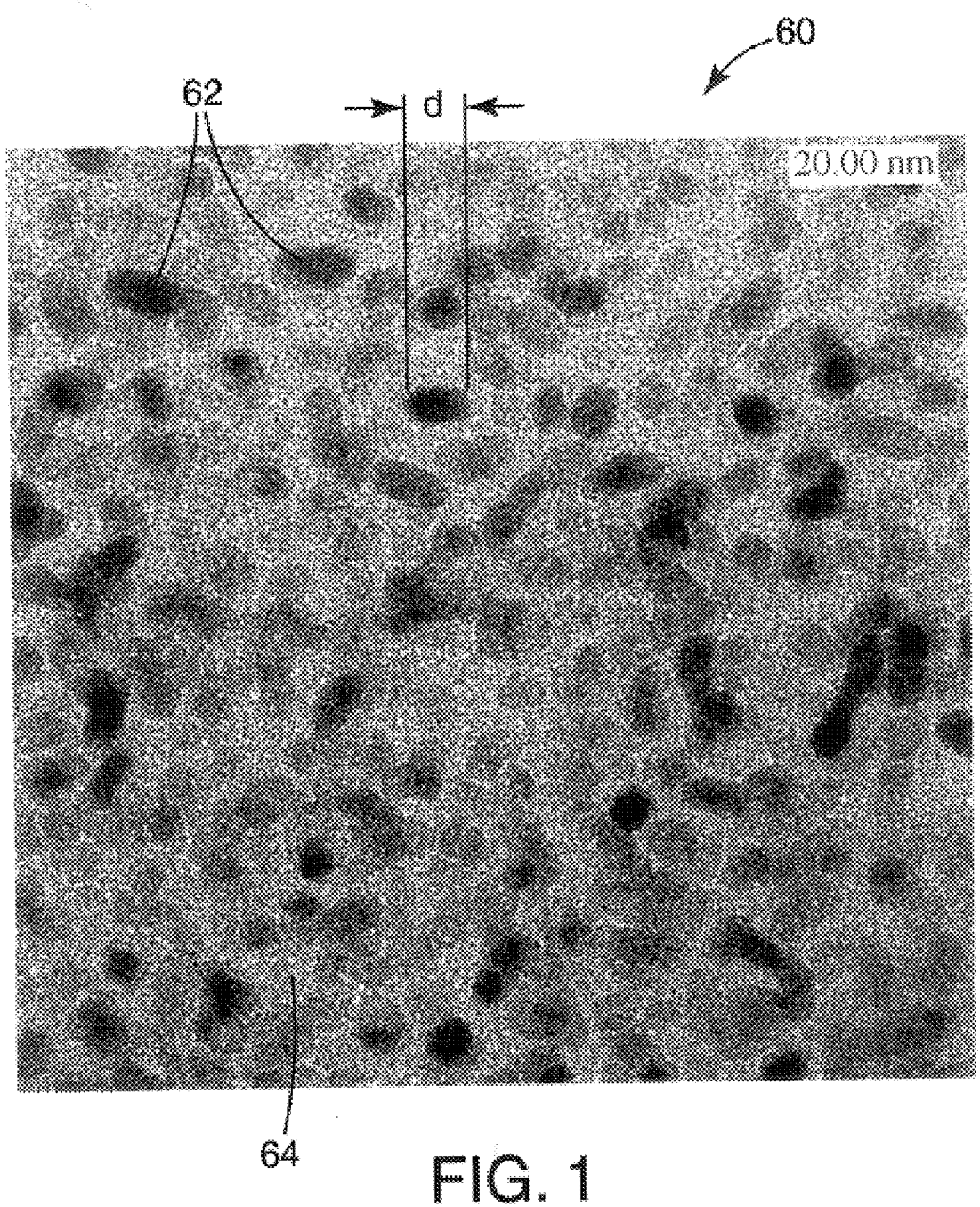
FIG. 1 is an electron photomicrograph of a ceramer of the present invention comprising 15 weight percent of titanium oxide particles of the present invention dispersed in polynonylphenyl acrylate. The photomicrograph was taken at a magnification of 100,000 X.

The present invention allows for the controllable increase of the refractive indexes of organic compositions by the addition of specific volume fractions of metal oxide particles (of the present invention) to the compositions. The metal oxide particles are small in size (4–20 nanometer size range), are substantially non-agglomerated within an organic matrix, and are readily dispersed and sterically stabilized in non-polar liquids, polar liquids, or polymer precursors. It is important that the metal oxide particles are crystalline in nature since such crystalline particles have higher refractive indexes than amorphous metal oxide particles. The invention relates to titanium oxide particles, or particles of mixed oxides of metals including titanium, produced by the hydrolysis of appropriate metal alkoxides in the presence of substoichiometric amounts of water. These highly crystalline oxides are formed under conditions which allow them to be treated with dispersing aids and/or coupling agents, before significant agglomeration of the primary particles can occur, followed by transfer of the surface-treated particles to a medium comprising polymer precursor or an organic solvent. The particles may optionally be dried at this point and readily redispersed. The particle size distributions, high refractive indexes, and freedom from agglomeration of these particles, combined with the case of direct transfer to a medium comprising polymer precursors, allows the simplified production of high refractive index, transparent composites (ceramers) having superior properties.

Method of Making Metal Oxide Particles

Metal oxide particles of the present invention are derived from metal alkoxides having the formula (1) where M is a metal, A is an alkoxide ligand, and X represents the number of alkoxide ligands bound to M.

$$M(A)_x \qquad (1)$$

Some suitable metal alkoxides used to make the metal oxide particles of the present invention have an M selected from the group consisting of barium and titanium or mixtures thereof. Typically, A is selected from the group consisting of 1-butoxide, 2-ethylhexoxide, 2-methoxy-1-ethoxide, linear and branched alkoxides (for example, ethoxide, 1-propoxide, 2-propoxide, 2-butoxide, iso-butoxide, tert-butoxide, and hexoxide). Two or more of the same or different alkoxide ligands may be attached to M. Typically, X is 2 when M is barium and X is 4 when M is titanium. Preferably, when M is titanium, A is 1-butoxide and/or 2-ethylhexoxide. When M is barium, the preferred alkoxide is 2-methoxy-1-ethoxide. The metal alkoxides used to make the discrete, uniform, organophilic, metal oxide particles of the present invention may be purchased commercially or synthesized within the laboratory. For example, barium metal alkoxides may be synthesized directly by a reaction of a metal with an alcohol as described in Frey et al., *Chemistry of Materials* 7, 123 (1995).

The metal alkoxide is combined with a complexing agent at ambient temperature and hydrolyzed. Typically, commercially available metal alkoxides are in the form of a liquid having a theoretical oxide content in the range of 14 to 33 percent by weight. This concentration of metal alkoxide in the liquid may be modified prior to combining the liquid with the complexing agent. Typically, the concentration is modified by adding a non-aqueous solvent, such as an aliphatic alcohol (for example, ethanol, 2-propanol, 1-butanol, 2-butanol, 2-ethyl hexanol) or an alkoxy-alcohol (for example, 2-methoxyethanol), to the metal alkoxide liquid. Preferably, the solvent is an alcohol directly corresponding to the protonated form of the alkoxide ligand. The metal alkoxide is combined with a complexing agent such as acetic acid, aliphatic acids (especially butyric acid, hexanoic acid, and 2-ethyl-hexanoic acid), and other organic complexing agents, or combinations thereof. More than one complexing agent may be combined with the metal alkoxide. The preferred complexing agent is hexanoic acid. The complexing agent to titanium mole ratio is typically 0.1 to 2.0, preferably 0.25 to 1.0.

Substantially all of the alkoxide is hydrolyzed by adding substoichiometric amounts of water to the sample and heating the sample under pressure. Typically, 2 moles of water or less are added per the moles of titanium metal atoms in the metal alkoxide. In some situations when the metal is titanium, water is not added, for example, when the organic acid complexing agent is able to undergo esterification and the organic acid to metal ratio is about 2.0. In other situations, the water may be added as an alcoholic solution. While not wishing to be bound by theory, it is believed that the use of substoichiometric amounts of water prevents agglomeration of the particles prior to stabilization by the addition of dispersants and/or complexing agents.

After the addition of water, the metal alkoxide mixture is placed within a pressure vessel such as a stirred or non-stirred pressure reactor, commercially available from Parr Instruments Co., Moline, Ill. The vessel should be capable of withstanding pressure and capable of sealing. A preferred vessel is a stirred pressure reactor (Pressure Reactor #4560, commercially available from Parr Instruments Co., Moline, Ill.). The vessel containing the alkoxide mixture is sealed and the solution is heated under autogenous vapor pressure to a temperature satisfactory to drive the hydrolysis and condensation of the reactants. Typically, the vessel is heated at a rate of 5° C./minute until the desired temperature is reached. Generally, the desired temperature is greater than 120° C. and less than 300° C. Preferably, the temperature is between 150° C. and 250° C. Suitable autogenous vapor pressures are governed by the temperature and the vessel used to heat the metal alkoxide solution. Heating the solution within the closed vessel creates pressure. The pressure within the vessel is typically between 18 atmospheres to 40 atmospheres. Typically, the solution is heated 0.5 to 5 hours to ensure complete hydrolysis although shorter reaction times can be effective. After heating and subsequent cooling to room temperature, the metal oxide particles are observed as a white precipitate. The metal oxide particles are separated from the liquid by transferring the slurry into centrifuge bottles, centrifuging the slurry, and decanting the supernate. Other methods of separating the metal oxide particles from the reaction mixture are possible such as filtration, sedimentation, or flushing. Alternatively, the unwanted components of the reaction mixture may be removed by evaporation or by selective distillation. At this point, the metal oxide particles maybe dried for the determination of crystallite diameter, the percent crystallinity, and the crystallinity index of the metal oxide particles.

Formation of a Colloid

After separation, the metal oxide particles are transferred to a container containing an organic solvent (typically aprotic) or a solution containing an organic solvent and a dispersing aid to form slurry. Suitable organic solvents include $C_6$–$C_8$ aliphatic compounds, aromatic compounds, and/or ketones. Examples of such solvents include heptane, toluene, xylene, 2-butanone, or 4-methyl-2-pentanone. Solvents used in the present invention are chosen based on volatility and compatibility with the polymer precursors used in formulating ceramers. The amount of solvent is typically about 4 to 50 times the theoretical weight of metal oxide in the precipitate. Preferably, the amount of solvent is about 9 to 20 times the theoretical weight of metal oxide in the precipitate. Theoretical weight of the metal oxide in a sample is calculated from the weight of metal alkoxide used as a starting material, assuming there is one hundred percent yield.

Metal oxide particles of the present invention are combined with at least one dispersing aid that attaches to the surface of the metal oxide particles. It is believed that the mixture of dispersing agents may allow higher concentrations of the particles to be incorporated into a ceramer precursor at equivalent viscosities. Suitable dispersing aids include alkoxyorganosilanes, organic acids such as carboxylic acids, alcohols, polyethylene glycols, mono- or di-esters of fatty acids, polyethylene oxide and polypropylene oxide, or combinations thereof. Preferred dispersing aids include alkoxyorganosilanes and carboxylic acids, or mixtures thereof. Preferred alkoxyorganosilanes include octyltriethoxysilane, octadecyltrimethoxysilane, hexadecyltrimethoxysilane, and combinations thereof. Other suitable dispersing agents include stearic acid, oleic acid, and KEN-REACT Coupling Agent KR TTS, commercially available from Kenrich Petrochemicals, Bayonne, N.J. Dispersing aids that are coupling agents may be used. As described in the definition section of the patent application, a coupling agent is a dispersing aid with two functional groups. Suitable coupling agents include methacrylic acid, glycine, glycolic acid, thiolacetic acid, methacryloyloxyethyl acetonacetate, allyl acetoacetate, 3-acryloxypropyltrimethoxysilane, 3-aminopropyltriethoxysilane, 3-mercaptopropyltrimethoxysilane, 3-glycidoxypropyltrimethoxysilane, 7-oct-1-enyltrimethoxysilane, and allyl triethoxysilane. After the addition of the dispersing aid, the theoretical percent solids of the resulting slurry is in the range of 2 to 20 weight percent oxide, and preferably 5 to 10 weight percent metal oxide. The slurry typically has a ratio of dispersing agent to metal oxide product of about 0.1 to 6.0 millimole/gram, preferably 0.2 to 2.0 millimole/gram. The slurry is then stirred, preferably with heating at temperatures greater than 60° C. and less than about 95° C., until the slurry particles completely disperse as primary nanocrystallites to provide a stable, transparent colloid. An amount of water (neutral, acidic, or alkaline) may then be added in sufficient amount to remove any remaining hydrolyzable groups and further condense dispersing agents to the particle surface. For the purpose of the present invention, base hydrolysis was found to be particularly advantageous for hydrolysis of the alkoxy-organosilane and condensation onto the particle surface.

An optional step involves the removal of high boiling point by-products from the stable colloidal dispersion. This stable colloidal dispersion is concentrated to a syrup by heat or vacuum drying. If the stable colloidal dispersion comprises a polar liquid, the crystalline nanoparticles are weakly flocced by the addition of a non-polar liquid (flocculating liquid). If the stable colloidal dispersion comprises a non-polar liquid, the crystalline nanoparticles are weakly flocced by the addition of a polar liquid (flocculating liquid). The flocculated nanoparticles are typically isolated by centrifugation and then washed by resuspension in one of the flocculate liquids and separated by centrifugation. The precipitate may be dried to form a powder, or the precipitate may be dispersed in an organic liquid or solvent to form a colloid or sol.

Colloids of the present invention are stable dispersions as measured by centrifuging the colloid samples at 2500 rpm for 10 minutes. Colloids (or sols), if substantially free of sediment after centrifugation, are said to be stable dispersions. Colloids of the present invention are stable dispersion and have an absorptivity measurement less than 3.0, preferably less than about 1.20. The colloids of the present invention may have an absorptivity measurement in the range of about −0.650 to about 3.00, and preferably in the range about −0.650 to about 1.20. The absorptivity of the colloids were determined when the colloids included a metal oxide content in the range of about 10 weight percent metal oxide content to about 35 weight percent metal oxide content as described in the absorptivity test procedure.

Absorptivity Test Procedure

Metal oxide particles of the present invention are described in part as having a particular absorptivity measurement when dispersed in an organic liquid. Metal oxide particles of the present invention, when placed in at least one of four organic liquids, must form a stable colloidal dispersion comprising a metal oxide content in the range of about 10 to about 35 weight percent. The organic liquid used to make a colloid for purposes of the absorption test procedure and for defining a characteristic of the particles of the present invention, is selected from the group consisting of heptane, xylene, toluene, and 2-butanone. After mixing one of these organic liquids with the metal oxide particles of the present invention, the mixture is centrifuged at 2500 revolutions per minute for 10 minutes using International Equipment Co., Model EXD, commercially available from Fisher Scientific Company, Pittsburgh, Pa., using rotor No. 259. After centrifugation, the samples are visually inspected for particle settling. Dispersions of metal oxide particles of the present invention are substantially free of particle settling and are thus considered to be stable dispersions. Only metal oxide particles that form stable dispersions in one or more of the four organic liquids are considered to be part of the present invention.

Metal oxide particles of the present invention are further characterized by absorptivity measurements of a colloid (stable dispersion) produced from the metal oxide particles as described above. The colloid light absorptivity ($a_1$) is a measure of the degree of optical transparency of a colloid. The colloid light absorptivity ($a_1$) measurement is made on a ultraviolet/visible spectrophotometer (Perkin-Elmer Lambda 19) at a wavelength of 650 nanometers using a 1 millimeter pathlength quartz cuvet. The instrument was standardized against the pure solvent, and the spectra were recorded in percent transmittance (% T). Percent transmittance readings were then converted to transmittance, then to absorptivity ($a_1$), as follows: $a_1 = \log_{10}(1/T)lc$ where T is the transmittance, l is the cell path length in centimeters, and c is the concentration of metal oxide in grams of metal oxide per gram colloid. The absorptivity value ($a_1$) is determined at 650 nanometers for each colloid.

Metal Oxide Particles

FIG. 1 is a photomicrograph of a ceramer (60) containing the metal oxide particles (62) of the present invention dispersed in an organic matrix (64). This ceramer (60) includes 15 weight percent of titanium oxide particles (62) dispersed in nonylphenyl acrylate polymer, the organic matrix (64). FIG. 1 illustrates that the titanium oxide particles are generally ellipsoidal and are uniform in size, typically in the size range of 4 to 20 nanometers in diameter (d).

In general, the metal oxide particles of the present invention may have a size greater than about 5 nanometers and less than about 15 nanometers, or range in size greater from about 6 nanometers to less than about 11 nanometers. Metal oxide particles within a ceramer were measured from end to end (the longest diameter of the particle) as illustrated by d in the photograph. $TiO_2$ and $BaTiO_3$ particles may be made by this method. The preferred metal oxides include both $TiO_2$ and $BaTiO_3$. The metal oxides produced by this method typically have a degree of crystallinity (measured as isolated metal oxide particles) greater than 55 percent. The crystallinity of the metal oxide particles (as isolated from a colloid) is typically between about 55 percent to about 86 percent. Preferably, the degree of crystallinity of the metal oxide particles (as isolated from a colloid) is determined to be between about 60 percent to about 70 percent. The crystallites of the metal oxide particles of the present invention are determined to be tetragonal or cubic.

For crystallized nanoparticles, the percent crystallinity varies with the crystallite diameter. Atoms and ions in the surface region of the particle are distorted relative to the core. Thus, the surface region does not generally contribute to the measured crystallinity. In general, larger particles have a smaller effective volume distorted by surface effects and thus are determined to have a higher measured percent crystallinity. The thickness of the distorted layer depends on the thermal processing of the particles. In the present invention, the thickness of the distorted layer ranges from about 0.49 nanometers to about 0.55 nanometers. Theoretically, a 12.0 nanometer particle with a 0.5 nanometer distorted surface would exhibit 77 percent crystallinity.

The metal oxide particles also have a specific crystallinity index. The crystallinity index is defined as the ratio of percent crystallinity to crystallite diameter (such values are shown in Table 4). Methods of measuring crystallinity and crystallite diameter are shown in Test Procedures 8 and 9. The crystallinity indexes of the metal oxides of the present invention as illustrated below were determined to be greater than about 8.1 and less than about 9.5. The crystallinity indexes of the metal oxide particles of the present invention was preferably greater than about 5.0, preferably greater than 8.0, and more preferably greater than 9.0. The metal oxide particles are typically free of silica.

FIG. 1 illustrates that the metal oxide particles (62) of the present invention may be highly dispersed (or non-agglomerated) and uniform in size when combined with an organic matrix (64). The ability of the metal oxide particles to disperse within an organic matrix was measured by the inhibition of light transmission by scattering or light absorption as described in Test Procedures 6 and 7. The titanium oxide particles of the present invention are substantially free of water and other metal oxide particles such as silica. The method of making these metal oxide particles does not require addition of a seed, a step that is required in some conventional methods of making titanium oxide particles.

Method of Making A Ceramer

The metal oxide particles, in the form of a powder or a colloid, may be combined with an organic polymer precursor. The amount of metal oxide particles added to an organic polymer precursor is dependent upon the refractive index and the mechanical properties desired of the ceramer. The amount of metal oxide particles added to an organic precursor may be greater than zero weight percent and less than 80 weight percent. Depending upon the application, a ceramer may comprise from about 1 weight percent to about 80 weight percent, 50 weight percent to about 78 weight percent, or about 40 weight percent to about 60 weight percent of metal oxide particles. Suitable polymer precursors, typically curable by a free radical mechanism are often characterized as ethylenically unsaturated monomers, such as olefins, styrenes, vinyl ethers, vinyl esters, allyl ethers, allyl esters, acrylates, methacrylates, acrylonitriles, methacrylonitriles, acrylamides, methacrylamides, azalactones, N-vinyl carbazole, and N-vinyl pyrrolidone. Other suitable organic matrixes include aziridine monomers and appropriate polyfunctional co-reactants. Suitable acrylates include mono- and poly-functional acrylates. If the metal oxide particles, used to form the ceramer were part of a colloid, after mixing the metal oxide particles with an organic polymer precursor, evaporation or distillation may remove the solvent associated with the colloid. The ceramer composition may be mixed with an initiator. Heat or radiation may then cure the ceramer composition. Radiation curing includes microwave, ultraviolet light, visible light, and/or electron beam. The organic matrix is preferably substantially free of an agent selected from the group consisting of water, alcohols, and combinations thereof.

Figure 2:
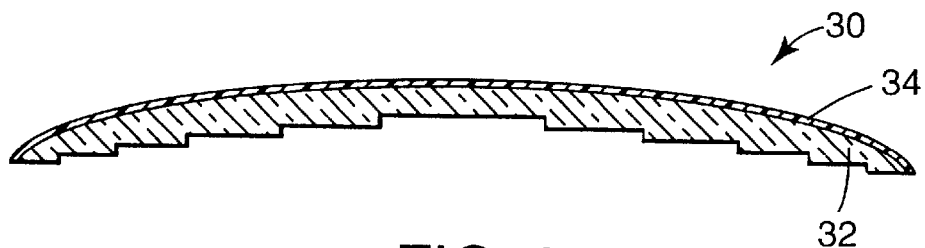
FIG. 2 is a sketch of a ceramer in the form of a coated lens.

The ceramers may be formed by conventional methods into light management devices or optical elements such as lenses and light transmission devices. FIG. 2 illustrates a coated optical lens (30) comprising a lens (32) and a coating (34) attached to the surface of the lens. Ceramers of the present invention may be used to make the lens (32), the coating (34) or both elements of the coated optical lens (30). The ceramer of the lens (32) may have a refractive index or characteristics different from that of the ceramer of the coating (34). The refractive index of a ceramer may be modified by varying the weight percent of metal oxide particles of the present invention within the ceramer.

Figure 3:
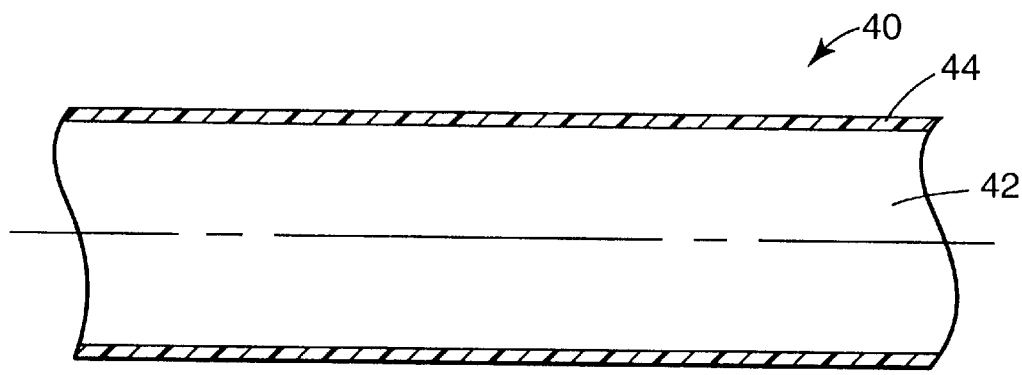
FIG. 3 is a sketch of a ceramer in the form of a coated optical fiber.

FIG. 3 illustrates a coated optical fiber (40) comprising a light transmission filament (42) and a coating (44) attached to the surface of the light transmission filament (42). Ceramers of the present invention may be used to make the light transmission filament (42), the coating (44), or both elements of the coated optical filament (40). The ceramer of the light transmission filament (42) may have a refractive index or characteristics different from that of the ceramer of the coating (44). Varying the weight percent of metal oxide particles may modify the refractive index of a ceramer. Characteristics of coated articles are affected by refractive indexes of the substrate and the coating. For example, the coatings (34) and (44) illustrated in FIG. 2 and FIG. 3 may be antireflective or highly reflective depending upon the difference of the refractive index at the interface between the coating and the substrate. It is possible that more than one layer of a ceramer coating may be applied to a surface of a substrate and that each layer has the same or different physical characteristics (such as refractive index). Suitable substrates include glass, plastic, and metals. These substrates may be in any number of forms such as lenses, sheets, fibers, prisms, computer screens, and/or CRT fact plates.

During the manufacture of the coated substrate, the precursor composition is applied to at least a portion of the substrate. Preferably and advantageously, this precursor composition is directly applied to the substrate. Optionally, the precursor composition can be applied to the substrate that has been primed, for example treated with a conventional primer. A ceramer layer having a thickness of 125 microns was prepared and the layer was substantially transparent. Transparent drops of ceramer having a thickness of approximately 1 to 2 millimeters were also prepared. Other examples of transparent ceramer layers of various thicknesses can be observed in the Example section of the present patent application.

Figure 4:
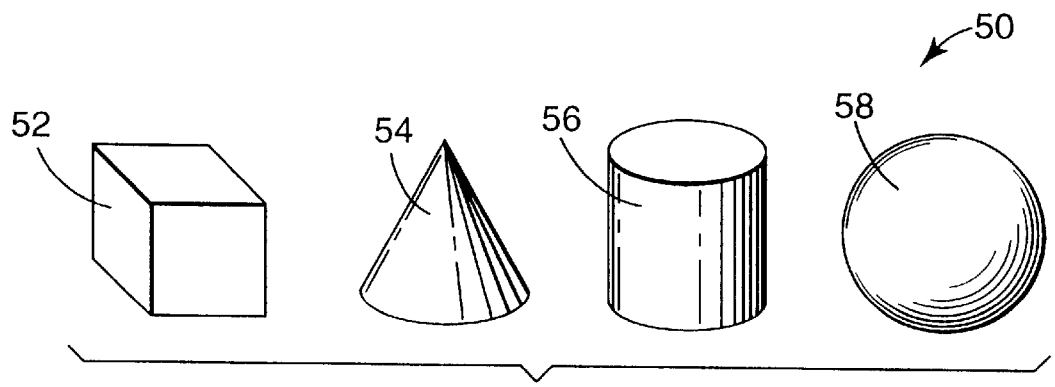
FIG. 4 is a sketch of a ceramer containing the metal oxide particles of the present invention in the form of articles having well defined shapes.

The ceramer composition of the present invention may be formed into articles having a variety of shapes and sizes. FIG. 4 illustrates shaped composites (50) that are made from the ceramers of the present invention. The composites may be in the shape of a cube (52), a cone (54) a cylinder (56), and a sphere (58). The composite shape may be irregular. These composites may be made by conventional methods including microreplication and extrusion. The composite of the present invention may be any size but are preferably in the range of 1/10 to 10 millimeter. These composites may be combined with other polymer precursors to provide reflective or anti-reflective coatings on substrates such as traffic signs.

The absorptivity of a ceramer (as illustrated in the examples) including about 40 weight percent metal oxide to about 80 weight percent metal oxide was in the range of about −1.06 to about 8.43. These same ceramers when measured for refractive index had a refractive index greater than 1.6. The refractive indexes of the polymer precursors used to make the ceramers described in the example section were increased by the addition of the metal oxide particles of the present invention to the polymer precursors. The results are shown in Table 2. Preferably, the refractive index of ceramer composition is greater than about 1.65.

EXAMPLES

The examples below are carried out using standard techniques, which are well known and routine to those skilled in the art, except where otherwise described in detail. The examples are illustrative, but do not limit the invention.

Unless otherwise noted, chemicals used in the examples were commercially available from Aldrich Chemical Co., Milwaukee, Wis. Nonylphenyl acrylate, perfluorocyclohexylmethyl acrylate, and vinyl toluene were commercially available from Monomer-Polymer & Dajac Laboratories, Inc., Trevose, Pa. Hexadecyltrimethoxysilane, octadecyltrimethoxysilane, octyltriethoxysilane, 3-mercaptopropyltrimethoxysilane, and 7-octenyl trimethoxysilane were commercially available from United Chemical Technologies, Inc., Bristol, Pa. Tetrahydrofurfuryl acrylate was commercially available from Sartomer Company, Inc., Exton, Pa., under the tradename SR 285. Trimethylolpropane triacrylate was commercially available from Sartomer Company, Inc., Exton, Pa., under the tradename SR 351. Irgacure 4265 was commercially available from Ciba-Geigy Corp., Tarrytown, N.Y. Vazo 64 was commercially available from Du Pont Chemicals, Wilmington, Del.

Particles and Ceramers

Example 1

Particle Preparation

In a nitrogen filled glovebox, 10.2 grams of hexanoic acid was added dropwise to 60 grams of tetrabutyl titanate. Following the addition of 5.56 grams of deionized water, the solution was shaken vigorously for 2 minutes, then transferred to a 300 milliliter stirred pressure reactor (Pressure Reactor #4560, commercially available from Parr Instruments Co., Moline, Ill.) that was purged with dry nitrogen for 10 minutes. The pressure reactor was heated at a rate of 5° C./minute until the liquid was heated to 225° C. The liquid was stirred at 190 rpm (revolutions per minute) under 20.4 atmosphere for approximately 2 hours. Upon cooling, the solution became nearly colorless with the formation of a white precipitate. The precipitate was separated from the liquid by first transferring the slurry into centrifuge bottles and centrifuging the bottles at 2500 rpm for 10 minutes using an International Equipment Company Model EXD centrifuge, commercially available from Fisher Scientific Company, Pittsburgh, Pa. After centrifugation, the liquid was decanted and the solid was transferred into a 1-liter round bottom flask containing 200 milliliter of anhydrous meta-xylene and 4.00 grams hexadecyltrimethoxysilane. The mixture was stirred forming a white slurry with uniform metal oxide particles. This slurry was heated to 90° C. for 1 hour to provide a transparent colloid. The transparent colloid was concentrated on a rotary evaporator under vacuum at 40° C. until meta-xylene ceased to distill providing an opaque syrup. The colloidal titanium oxide particles were precipitated by the addition of 500 grams acetone forming a slurry. The slurry was stirred for 1 hour, then transferred into centrifuge bottles and the solid separated from the supernatant by centrifugation at 2500 rpm for 10 minutes. The supernatant was decanted and the particles were dried under vacuum overnight. The particles were dispersed into heptane or toluene to provide a transparent colloid of high oxide content. Using Test Procedure 8, the crystallites of metal oxide particles were found to be tetragonal.

Example 2

Particle Preparation

In a nitrogen filled glovebox, 17.1 grams of hexanoic acid was added dropwise to 100 grams of tetrabutyl titanate. Outside of the nitrogen filled glovebox, 9.26 grams of deionized water was added to the solution, the solution was shaken vigorously for 2 minutes, then transferred to a 300 milliliter stirred pressure reactor (Pressure Reactor #4560, commercially available from Parr Instruments Co., Moline, Ill.) that was purged with dry nitrogen for 10 minutes. The liquid was heated to 250° C. (at a rate 5° C./minute) and stirred at 190 rpm under 37.4 atmosphere for approximately 5 hours. Upon cooling, the solution became nearly colorless with the formation of a white precipitate. The precipitate was separated from the liquid by first transferring the slurry into centrifuge bottles and centrifuging the bottles at 2500 rpm for 10 minutes using an International Equipment Company Model EXD centrifuge, commercially available from Fisher Scientific Company, Pittsburgh, Pa. After centrifugation, the liquid was decanted. Further purification of the particles was accomplished by resuspending the particles in a fresh portion of hexane and then centrifuging the slurry at 2500 rpm for 10 minutes followed by decanting the hexane. The percent crystallinity and crystallite diameter were determined by Test Procedures 8 and 9 with the results shown in Table 4. Using Test Procedure 8, the crystallites of the metal oxides were found to be tetragonal.

Example 3

Particle Preparation

In a nitrogen filled glovebox, 25.41 grams of 2-ethylhexanoic acid was rapidly added to 120 grams of tetrabutyl titanate. 13.0 grams of deionized water was rapidly added to the solution, the mixture was shaken vigorously for 2 minutes, then transferred into a 300 milliliter stirred pressure reactor (Pressure Reactor #4560, commercially available from Parr Instruments Co., Moline, Ill.) that was purged with dry nitrogen for 10 minutes. The liquid was heated to 220° C. and stirred at 190 rpm under 18.7 atmosphere for approximately 2 hours. Upon cooling, the solution became nearly colorless with the formation of a white precipitate. The precipitate was separated from the liquid by first transferring the slurry into centrifuge bottles and centrifuging the bottles at 2500 rpm for 10 minutes using an International Equipment Company Model EXD centrifuge, commercially available from Fisher Scientific Company, Pittsburgh, Pa. Further purification of the particles was accomplished by resuspending the particles in a fresh portion of hexane and then centrifuging the slurry at 2500 rpm for 10 minutes followed by decanting the hexane. The percent crystallinity and crystallite diameter were determined by Test Procedures 8 and 9 with the results shown in Table 4. Using Test Procedure 8, the crystallites of the metal oxide particles were found to be tetragonal.

Colloid Preparation

The moist particles were transferred into a 1-liter round bottom flask containing 600 milliliters of anhydrous meta-xylene, 4.69 grams of octyltriethoxysilane, and 2.11 grams of octadecyltrimethoxysilane. The mixture was stirred to provide a white slurry. The slurry was heated to 85° C. for 2 hours to provide a transparent dispersion. A small quantity of insoluble material was removed by filtering this colloid through a 0.45 micron syringe filter (Gelman Aerodisc, commercially available from Fisher Scientific Company, Pittsburgh, Pa.). At this point, the colloid may be added to organic monomers or polymer precursors to form ceramer compositions. For purposes of taking physical measurements of the colloid, the colloid was concentrated on a rotary evaporator to provide a transparent colloid having a metal weight percent of 34.53 percent, as determined by Test Procedure 2. The absorptivity ($a_1$) of this concentrated colloid was determined by Test Procedure 7 with the result shown in Table 3.

Example 4

Alkoxide Preparation

A barium titanate precursor solution was prepared using a slight modification of the procedure reported in Frey et al.,

*Chemistry of Materials* 7, 123 (1995). This procedure begins by preparing a titanium methoxyethoxide solution in which 61.9 grams of tetrabutyl titanate were added to 700 grams of anhydrous 2-methoxyethanol under dry nitrogen. The solution was heated to 110° C. and allowed to reflux for 1 hour. The 1-butanol was removed from the solution by atmospheric pressure distillation beginning at 114° C. The distillation was stopped when the temperature reached 125° C. The solution was cooled to room temperature and an additional 200 grams of 2-methoxyethanol was added. The solution was then cooled to 5° C. and 25 grams of barium metal chips. commercially available from Cerac Inc., Milwaukee, Wis., was added to the solution under a gentle flow of dry nitrogen while the solution was being stirred. The slurry was stirred for 12 hours under dry nitrogen and then was heated to 124° C. for 2 hours. The solution was then cooled to provide slurry containing barium titanium alkoxide and had a theoretical metal oxide equivalent content of 7.3 weight percent.

Particle Preparation

In a nitrogen filled glovebox, 20 grams of the barium titanium alkoxide slurry was transferred into a 40 milliliter screw cap jar. Outside of the nitrogen filled glove box, the barium titanium alkoxide slurry was mixed with 0.73 gram hexanoic acid and 0.395 gram of deionized water. The mixture was shaken vigorously for approximately 1 minute and then transferred into a 45 milliliter Teflon lined, non-stirred pressure vessel (Pressure Vessel Model #4744, commercially available from Parr Instruments Co., Moline, Ill.). The reactor head space was purged with dry nitrogen for 2 minutes. The reactor was then heated to 225° C. at 5° C./minute and the temperature maintained for 2 hours. The slurry was cooled and then poured into a centrifuge bottle and the barium titanate particles were separated from the liquid by centrifuging at 2500 rpm for approximately 10 minutes using an International Equipment Company Model EXD centrifuge, commercially available from Fisher Scientific Company, Pittsburgh, Pa.

The crystallite diameter and percent crystallinity were determined by Test Procedures 8 and 9. The results are shown in Table 4. Using Test Procedure 8, the crystallites of the metal oxide particles were found to be cubic.

Colloid Preparation

The supernatant was decanted and the moist $BaTiO_3$ particles were transferred into a glass vial containing approximately 20 grams of toluene and 0.51 grams of hexadecyltrimethoxysilane. The suspension was heated to 85° C. and stirred for 2 hours and a transparent colloid with a small amount of settled insoluble material was formed. The insoluble material was removed by filtration through a Gelman Acrodisc 0.45 micron polytetrafluoroethylene syringe filter, commercially available from Fisher Scientific Company, Pittsburgh, Pa. The dispersion was concentrated until toluene ceased to distill using a rotory evaporator. Approximately 40 milliliters of acetone was added to the syrup and the resulting mixture stirred for 3 hours following the immediate precipitation of weakly flocced particles. The slurry was transferred to centrifuge bottles and centrifuged at 2500 rpm for 10 minutes followed by decanting the supernate to isolate the particles. Further purification of the particles was accomplished by resuspending the particles in fresh portions of acetone and centrifuging the slurry at 2500 rpm for 10 minutes. The particles were isolated and dried under a vacuum at room temperature for approximately 12 hours. These particles were found to redisperse with mild agitation in heptane and toluene to provide high percent solids transparent colloids.

Example 5

Particle Preparation

In a nitrogen filled glovebox, 1.7 grams of hexanoic acid was rapidly added to 10 grams tetrabutyl titanate in a 20 milliliters screw cap glass vial and shaken vigorously. Outside of the nitrogen filled glovebox, 0.93 gram deionized water was added to the solution and the solution was vigorously shaken for one minute, then transferred to a 23 milliliter Teflon lined non-stirred, pressure vessel (Pressure Vessel Model #4749, commercially available from Parr Instruments Co., Moline, Ill.) that was purged with nitrogen for 1 minute. The reactor was heated to 235° C. for approximately 5 hours. Upon cooling, the solution was nearly colorless and contained a white precipitate. The precipitate was separated from the liquid by placing the slurry into centrifuge bottles which were centrifuged at 2500 rpm for 10 minutes using an International Equipment Company Model EXD centrifuge, commercially available from Fisher Scientific Company, Pittsburgh, Pa. The liquid was decanted. Further purification of the particles was accomplished by resuspending the particles in a fresh portion of hexane and then centrifuging the slurry at 2500 rpm for 10 minutes followed by decanting the hexane. This purification was performed prior to using Test Procedures 8 and 9. The crystallite diameter and the percent crystallinity were determined by Test Procedures 8 and 9 with the results shown in Table 4. Using Test Procedure 8, the crystallites of the metal oxide particles were found to be tetragonal.

Example 6

Colloid Preparation

Moist $TiO_2$ particles (calculated as 2.28 grams of titanium dioxide) of Example 5 were transferred into a solution containing 40 milliliter of anhydrous 2-butanone, 0.21 gram of octadecyltrimethoxysilane, 0.14 gram glycidoxypropyltrimethoxysilane, and 0.69 gram of 3-methacryloyloxypropyltrimethoxysilane. The slurry was stirred and then heated to 60° C. for 2 hours forming a translucent colloid. A dilute ammonium hydroxide solution was prepared by placing 8 drops of aqueous 30 percent ammonium hydroxide into 3.64 grams deionized water. Then 0.68 gram of dilute ammonium hydroxide was mixed with 3 milliliters of 2-butanone and added to the translucent colloid at a temperature of 68° C. to provide a transparent colloid. After reducing the temperature of the mixture to 45° C. and stirring the mixture for 12 hours, the mixture was concentrated until 2-butanone ceased to distill using a rotary evaporator (temperature 30° C.). Approximately 40 milliliters of hexane was added and the mixture stirred for 1 hour following the immediate precipitation of weakly flocced particles, forming a slurry. The slurry was transferred to centrifuge bottles, then centrifuged at 2500 rpm for 10 minutes, followed by decanting the supernate and isolation of the particles. Further purification of the particles was accomplished by resuspending the particles in a fresh portion of hexane and then centrifuging the slurry at 2500 rpm for 10 minutes followed by decanting the hexane. The titania particles were dispersed in 30 milliliters of 2-butanone forming a transparent pale yellow, colloidal solution.

Example 7

Particle Preparation

In a nitrogen filled glovebox, 1.7 grams of hexanoic acid was rapidly added to 10 grams tetrabutyl titanate in a 20 milliliters screw cap glass vial and shaken vigorously. Outside of the nitrogen filled glovebox, 0.93 grams deionized water was added to the solution, the solution was vigorously shaken for one minute, then transferred to a 23 milliliters Teflon lined non-stirred, pressure vessel (Pressure Vessel Model #4749, commercially available from Parr Instruments Co., Moline, Ill.) that was purged with nitrogen for 1 minute. The reactor was heated to 220° C. (at a rate of 5° C./minute) for approximately 2 hours. Upon cooling, the solution was nearly colorless with a white precipitate. The precipitate was separated from the liquid by placing the slurry into a centrifuge bottle and by centrifuging the slurry at a speed of 2500 rpm for 10 minutes using an International Equipment Company Model EXD centrifuge, commercially available from Fisher Scientific Company, Pittsburgh, Pa.

Colloid Preparation

After centrifugation, the liquid was decanted and the solid was transferred into a vial containing 40 milliliters heptane to provide a white slurry. 0.63 gram of oleic acid was added to the slurry and the mixture was shaken vigorously for about 3 minutes to provide a transparent, pale yellow colloid. This colloid was concentrated to a total weight of 6.9 grams of a rotory evaporator. The weight percent metal oxide was determined by Test Procedure 2 with the result shown in Table 1. The absorptivity ($a_1$) of the colloid was determined by Test Procedure 7 with the result shown in Table 3.

Example 8

Colloid Preparation

The colloid preparation of Example 3 was concentrated on a rotory evaporator until the colloid was substantially free of xylene. The resulting thick syrup weighed 21 grams. Then 22.3 grams heptane was added to the syrup to provide a transparent colloid having a metal oxide weight percent of 34.53 percent as determined by Test Procedure 2. The metal oxide particles of Example 3 were dispersed in heptane.

Example 9

Colloid Preparation

The colloid preparation of Example 6 was concentrated to a total weight of 7.01 grams with a total metal oxide content of 31.11 percent by weight using a rotary evaporator as determined by Test Procedure 2 with the result shown in Table 1. The absorptivity ($a_1$) of the colloid was determined by Test Procedure 7 with the result shown in Table 3.

Example 10

Particle Preparation 2.01 grams of oleic acid was rapidly added to 10 grams tetrabutyl titanate in a 20 milliliters screw cap glass vial and shaken vigorously for 2 minutes. To this liquid, 0.46 gram deionized water was added and the solution was vigorously shaken for one minute. The resulting liquid was transferred to a 23 milliliters Teflon lined, non-stirred, pressure vessel (Pressure Vessel Model #4749, available from Parr Instruments Co., Moline, Ill.). The reactor head space was purged with nitrogen for 1 minute, then the reactor was heated to 235° C. at a rate of 5° C./minute and held for 5 hours. Upon cooling, the solution was nearly colorless with a white precipitate. The precipitate was separated from the supernate by placing the slurry into a centrifuge tube, centrifuging the slurry at a speed of 2500 rpm for 10 minutes using an International Equipment Company Model EXD centrifuge, commercially available from Fisher Scientific Company, Pittsburgh, Pa. The absorptivity ($a_1$) of the colloid was determined by Test Procedure 7 with the result shown in Table 3. Using Test Procedure 8, the crystallites of the metal oxide particles were found to be tetragonal.

Colloid Preparation

After centrifugation was complete, the liquid was decanted and 7 grams of heptane were added to provide a transparent colloid. The absorptivity ($a_1$) was determined by Test Procedure 7 with the result shown in Table 3. The weight percent metal oxide was determined by Test Procedure 2 and the result shown in Table 1.

Example 11

Particle Preparation

Example 5 metal oxide particles (calculated as 22.8 grams of titanium dioxide) in 17.85 grams toluene were combined with 0.78 grams poly(ethylene glycol) methyl ether having a number average molecular weight ($M_n$) of 350. The mixture was heated to 85° C. for 2 hours to provide a transparent dispersion. A small amount of insoluble material was removed by filtration through a Gelman Acrodisc 0.45-micron polytetrafluoroethylene syringe filter. The metal oxide content of the resulting colloid was determined by Test Procedure 2 with the result shown in Table 1. The absorptivity ($a_1$) of the colloid was determined by Test Procedure 7 with the result shown in Table 3.

The colloid preparations were added to organic precursors to form ceramers as described in the next section of the patent application.

Ceramer 1

The colloidal preparation of Example 6 (2.28 grams titanium dioxide in 30 milliliters 2-butanone) was combined with 1.3 grams isooctyl acrylate. Then 0.04 gram Irgacure 4265 was added to the mixture and the mixture filtered through a Gelman Acrodisc 0.44-micron polytetrafluoroethylene syringe filter. The mixture was transferred to a 100 milliliters round bottom flask and placed on a rotory evaporator to remove the 2-butanone. The ceramer composition was coated and cured according to Test Procedures 4 and 6 for purposes of measuring refractive index and absorptivity, respectively. The metal oxide content of the ceramer was determined using Test Procedure 1 with the result shown in Table 1. The refractive index of the ceramer was determined using Test Procedure 4 with the result shown in Table 2. The absorptivity ($a_0$) of the cured ceramer was determined at 650 nanometers using Test Procedure 6 with the result shown in Table 3.

Ceramer 2

The colloidal dispersion of Example 6 (2.28 grams titanium dioxide in 30 milliliters 2-butanone) was combined with 1.3 grams tetrahydrofurfuryl acrylate and 0.04 gram Irgacure 4265. The mixture was transferred to a 100 milliliters round bottom flask and placed on a rotary evaporator to remove the 2-butanone. The ceramer composition was coated and cured as described in Test Procedures 4 and 6 for purposes of measuring refractive index and absorptivity, respectively. The metal oxide content of the ceramer was determined using Test Procedure 1 with the result shown in Table 1. The refractive index of the ceramer was determined using Test Procedure 4 with the result shown in Table 2. The absorptivity ($a_0$) of the cured ceramer was determined at 650 nanometers using Test Procedure 6 with the result shown in Table 3.

Ceramer 3

The colloid dispersion of Example 6 (2.28 grams titanium dioxide in 30 milliliters 2-butanone) was combined with 1.3 grams of nonylphenyl acrylate and 0.08 gram Irgacure 4265. The mixture was transferred to a 100 milliliters round bottom flask and placed on a rotory evaporator to remove the 2-butanone. The ceramer composition was coated and cured as described in Test Procedures 4 and 6 for purposes of measuring refractive index and absorptivity, respectively. The metal oxide content of the ceramer was determined using Test Procedure 1 with the result shown in Table 1. The refractive index of the ceramer was determined using Test Procedure 4 with the result shown in Table 2. The absorptivity ($a_0$) of the ceramer was determined at 650 nanometers using Test Procedure 6 with the result shown in Table 3.

Ceramer 4

Preparation of Coupling Agent/Dispersing Agent

Under dry nitrogen, 7.32 grams perfluorocyclohexylmethylacrylate was added dropwise to 1.96 grams of stirred 3-mercaptopropyltrimethoxysilane containing 0.4 gram triethylamine. The solution became warm upon addition of the acrylate. The mixture was allowed to stir 12 hours at room temperature. The triethylamine was removed under vacuum (ca. $10^{-1}$ Torr) to provide $C_6F_{11}CH_2OC(O)(CH_2)_2S(CH_2)_3Si(OCH_3)_3$.

Attaching Coupling Agent/Dispersing Agent to the Metal Oxide Particles

Example 5 particles (calculated as 2.28 grams of titanium dioxide) were added to 40 milliliters 2-butanone containing 0.69 gram $C_6F_{11}CH_2OC(O)(CH_2)_2S(CH_2)_3Si(OCH_3)_3$ and 0.62 gram 3-methacryloyloxypropyltrimethoxysilane. The mixture was heated to 68° C. with continuous stirring for 1.5 hours. The mixture was combined with 0.68 gram of a dilute ammonium hydroxide solution (8 drops of aqueous 30 percent ammonium hydroxide mixed with 3.64 grams deionized water) and 3 milliliters of 2-butanone at 68° C. The temperature was reduced to 45° C. and the colloid stirred 12 hours. The transparent colloid was concentrated on a rotory evaporator under vacuum at 30° C. until the 2-butanone ceased to distill to form a slightly opaque syrup. Approximately 40 milliliters of hexane was added to the syrup and the resulting mixture stirred for 1 hour following the immediate precipitation of weakly flocced particles. The slurry was transferred to centrifuge bottles and centrifuged at 2500 rpm for 10 minutes followed by decanting the supernate. Further purification of the particles was accomplished by resuspending the particles in a fresh portion of hexane and centrifuging the slurry at 2500 rpm for 10 minutes followed by decanting the hexane. The titania particles were combined with 30 milliliters of 2-butanone.

Formation of Ceramer

The colloidal suspension was added to 2.0 grams perfluorocyclohexyl methyl acrylate and 0.13 gram Irgacure 4265. The mixture was transferred to a 100 milliliters round bottom flask and placed on a rotory evaporator to remove the 2-butanone. The ceramer composition was coated and cured as described in Test Procedures 4 and 6 for purposes of measuring refractive index and absorptivity, respectively. The metal oxide content of the ceramer was determined using Test Procedure 1 with the result shown in Table 1. The refractive index of the ceramer was determined using Test Procedure 4 with the result shown in Table 2. The absorptivity ($a_0$) of the ceramer was determined at 650 nanometers using Test Procedure 6 with the result shown in Table 3.

Ceramer 5

A ceramer composition was prepared as in Ceramer 2, however using 0.04 gram Vazo 64 instead of 0.04 gram of Irgacure 4265. The ceramer composition was coated as described in Test Procedure 4 for measuring the refractive index of the ceramer and thermally cured at 85° C. for 15 minutes. The metal oxide content of the ceramer was determined using Test Procedure 1 with the results shown in Table 1. The absorptivity ($a_0$) of the ceramer was determined at 650 nanometers using Test Procedure 6 and the result is shown in Table 3.

Ceramer 6

Preparation of Coupling Agent/Dispersing Agent

Under dry nitrogen, 7.24 grams 4,6-dibromo-2-sec-butylphenylacrylate, from Minnesota Mining and Manufacturing Company, St. Paul, Minn., was added dropwise to 1.96 grams of stirred 3-mercaptopropyltrimethoxysilane and 0.18 gram triethylamine. The solution warmed slightly upon addition of the acrylate. The mixture was allowed to stir 12 hours at room temperature. The triethylamine was removed under vacuum (ca. $10^{-1}$ Torr) to provide 4,6-$Br_2$-2—$C_4H_9$—$C_6H_2$-OC(O)$(CH_2)_2$S$(CH_2)_3$Si$(OCH_3)_3$.

Attaching Coupling Agent/Dispersing Agent to the Metal Oxide Particle

Example 5 particles (calculated as 2.28 grams of titanium dioxide) were added to 40 milliliters 2-butanone containing 0.35 gram 4,6-$Br_2$-2—$C_4H_9$—$C_6H_2$-OC(O)$(CH_2)_2$S$(CH_2)_3$Si$(OCH_3)_3$ and 0.35 gram 3-methacryloyloxypropyltrimethoxysilane. The mixture was heated to 68° C. with continuous stirring for 1.5 hours. The mixture was combined with 0.35 gram of a dilute ammonium hydroxide solution (8 drops of aqueous 30 percent ammonium hydroxide mixed with 3.64 grams deionized water mixed with 3 milliliters of 2-butanone) at 68° C. The temperature was reduced to 45° C. and the colloid stirred 12 hours. The transparent colloid was concentrated until the 2-butanone ceased to distill using a rotory evaporator (30° C.). Approximately 40 milliliters of hexane was added to the mixture and stirred for 1 hour and following the immediate precipitation of weakly flocced particles. The slurry was transferred to centrifuge bottles and centrifuging the slurry at 2500 rpm for 10 minutes followed by decanting the supernate. Further purification of the particles was accomplished by resuspending the particles in a fresh portion of hexane and then centrifuging the slurry at 2500 rpm for 10 minutes followed by decanting the hexane. The titania particles were dispersed in 30 milliliters of 2-butanone forming a transparent pale yellow, colloidal solution.

Formation of Ceramer

The colloidal suspension was combined with 0.2 gram 4,6-dibromo-2-secbutylphenylacrylate and 0.05 gram Irgacure 4265. A portion of the 2-butanone was removed by vacuum distillation until the volume of the sample was approximately 5 milliliters. The ceramer composition was coated and cured as described in Test Procedure 3 for purposes of measuring the refractive index of the ceramer. The metal oxide content of the ceramer was determined using Test Procedure 1 with the result shown in Table 1. The refractive index of the ceramer was determined using Test Procedure 3 with the result shown in Table 2. The absorptivity ($a_0$) of the ceramer was determined at 650 nanometers using Test Procedure 6 with the result shown in Table 3.

Ceramer 7

1.50 grams of a nonylphenylacrylate nanocomposite syrup having a refractive index of 1.6418, as prepared in Ceramer 3, was mixed with 1.50 grams of a tetrahydrofurfuryl acrylate nanocomposite syrup having a refractive index of 1.6139 as prepared in Ceramer 2. This mixture was diluted with 10 grams 2-butanone. To the stirred solution was added 0.09-gram trimethylolpropane triacrylate and 0.08 gram Irgacure 4265. The 2-butanone was removed on a rotory evaporator to provide a pale orange syrup having a refractive index of 1.6222. The ceramer composition was coated and cured as described in Test Procedures 4 to 6 for purposes of measuring refractive index and absorptivity, respectively. The metal oxide content of the ceramer was determined using Test Procedure 1 with the result shown in Table 1. The refractive index of the ceramer was determined using Test Procedure 4 with the result shown in Table 2. The absorptivity ($a_0$) of the ceramer was determined at 650 nanometers using Test Procedure 6 with the result shown in Table 3.

Ceramer Composition 8

Preparation of Coupling Agent

Under dry nitrogen, 1.18 grams vinyl toluene was added dropwise to a stirred solution of 1.96 grams 3-mercaptopropyltrimethoxysilane in 10 milliliters anhydrous ethyl acetate. To the stirred mixture was added 0.02 gram Vazo 64 and the mixture was heated to 65° C. The mixture was allowed to stir 12 hours at 65° C. The ethyl acetate was removed under vacuum (ca. $10^{-1}$ Torr) to provide $CH_3-C_6H_4(CH_2)_2S(CH_2)_3Si(OCH_3)_3$.

Attaching Coupling Agent to the Metal Oxide Particles

Example 5 particles (calculated as 2.28 grams of titanium dioxide) were added to 40 milliliters 4-methyl-2-pentanone containing 0.39 grams $CH_3-C_6H_4(CH_2)_2S(CH_2)_3Si(OCH_3)_3$ and 0.47 grams 7-octenyltrimethoxy silane. The mixture was heated to 68° C. with continuous stirring for 1.5 hours. The mixture was combined with 0.68 gram of a dilute ammonium hydroxide solution (8 drops of aqueous 30 percent ammonium hydroxide mixed with 3.64 grams deionized water) combined with 3 milliliters of 4-methyl-2-pentanone at 68° C. The temperature was reduced to 45° C. and the colloid was stirred for 12 hours. Stirring was continued for an additional 36 hours at room temperature. The colloidal particles were purified as in Example 6 and then dispersed into 30 milliliters 2-methyl-4-pentanone.

Test Procedure 1: Determination of Weight Percent Metal Oxide Content in Ceramers of the Present Invention The metal oxide contents of Ceramers 1–7 as weight percentages were determined using a DuPont Instruments #2950 Thermal Gravimetric Analyzer. The weight percent of metal oxide in colloids and ceramer compositions of Ceramer 8 were measured by Test Procedure 2. A sample was heated to 200° C., at a rate of 10° C./minute, in air flowing at 60 cubic centimeter/minute and held isothermally for 30 minutes to determine the initial weight of samples following removal of water and other low boiling volatile components. Then the sample was heated to 900° C., at a rate of 20° C./minute, in air flowing at 60 cubic centimeter/minute to remove the remaining organic components and the percent solids as metal oxide determined by the Thermal Gravimetric Analyzer.

Test Procedure 2: Determination of Colloid Weight Percent Metal Oxide Content

The metal oxide content of colloids of Examples 3, 7–11, and the ceramer composition of Ceramer 8 as weight percentages were determined by gravimetric methods. The weighed sample was heated in a pre-weighed alumina crucible in air to 100° C. using a laboratory oven for 2–4 hours to remove volatile organic components. Then the sample was heated in air to 900° C. at a rate of 10° C./minute using a laboratory furnace to remove the remaining organic components and the percent solids as metal oxide determined by the difference of weight before and after firing.

Test Procedure 3: Determination of Ceramer Refractive Index Greater Than 1.8

The ceramer composition of Ceramer 6 was placed on a silicon substrate (commercially available from Monsanto, St. Louis, Mo.) between two 50 microns thick tape strips spaced 2 centimeters apart. The ceramer composition was spread between the silicon wafer and a polyester liner by pressing the assembly together on a flat surface with a 2500 grams steel coating bar. The polyester liner was removed by peeling and the film was cured on the silicon wafer as on the polyester substrates in Test Procedure 4. The cured film was then placed in an oven at 80° C. for 2 hours to drive off any residual 2-butanone.

Figure 5:
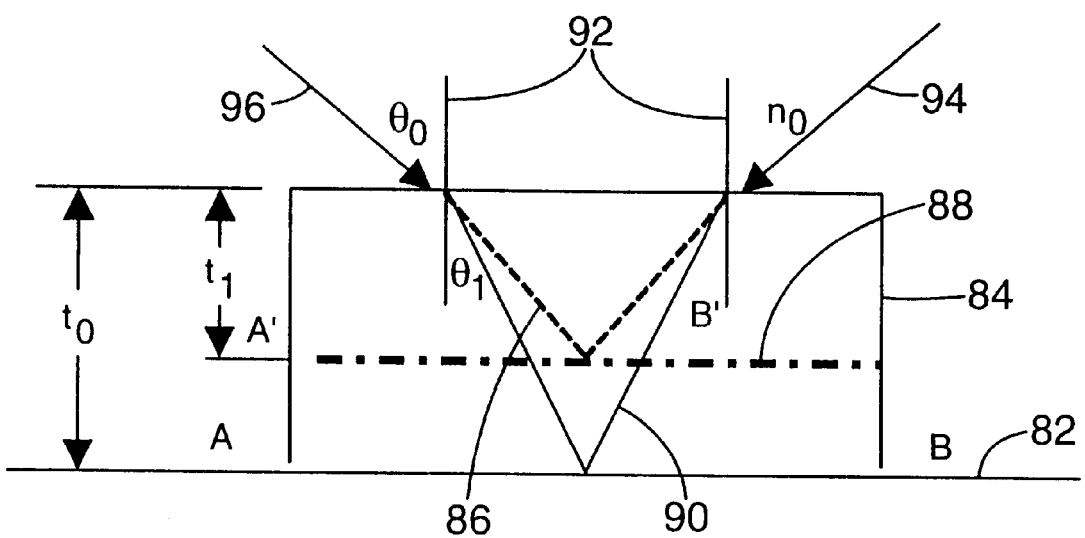
FIG. 5 is a sketch illustrating elements used in the determination of a refractive index of a transparent object. A laser scanning confocal microscope determined the refractive index.

The scanning confocal microscope method measures the refractive index of a thin ceramer layer of Ceramer 6 by measuring the apparent displacement of the interface between the ceramer layer and the substrate due to the refraction of the ceramer layer. As shown in FIG. 5, the image of the interface between the ceramer layer (84) and the substrate (82)(AB) will be displaced to A'B'. The amount of apparent displacement was used to extract the refractive index of the film (refractive index ($\eta_1$)=$t_0/t_1$) where $t_0$ refers to the absolute thickness of the ceramer layer and $t_1$ refers to the apparent thickness of the ceramer layer as viewed through the sample. However, the displacement was also dependent on the incident angle $\theta_0$, which varies within the numerical aperture of the objective. To minimize this effect, and objective lens with a small numerical aperture 20×/0.4, commercially available from Leica Lasertechnik Gmbh of Heidelberg, Germany, was used for recording the images. The refractive index was calculated using the following formula:

$$t_0/t_1 = \tan\theta_0/\tan\theta_1$$

if $\theta_0$ is small, $\eta_1 = t_0/t_1$.

The ceramer layer was placed under a scanning laser confocal microscope available from Leica Lasertechnik Gmbh of Heidelberg, Germany, and carefully moved under the microscope to find the location with sharp, thin film edges. Using the xz scanning mode, an image containing the interface between the film and the substrate (AB) as well as the displaced interface (A'B') was recorded. The image was processed to find the thickness $t_1$ and $t_0$. $\theta_1$ is the refraction angle, $n_0$ is the refractive index of air, (86) refers to the apparent light path, (90) refers to the actual light path, (92) refers to surface normals for calculating angles, (94) is a light path, and (96) is a second light path, (88) refers to displaced image of (82).

Test Procedure 4: Determination of Ceramer Refractive Index for Less than 1.8

The refractive index of approximately 25 microns thick layer of Ceramers 1–4 and 7 were determined. The ceramer composition was placed between two polyester liners having two 50 microns thick tape strips spaced 2 centimeters apart. The ceramer composition was spread between the polyester liners by pressing the assembly together on a flat surface with a 2500 grams steel coating bar. The film, in the presence of nitrogen, was cured at a translation speed of 20 feet/ minute using a UV curing station (Model #MC-6RQN, commercially available from Fusion Systems Corp., Rockville, Md., with a "D" bulb). Upon curing, the refractive index of the film was determined using Aus Jena INTERPHAKO interference microscope. This microscope was commercially available from JENOPTIC JENA GmbH, Jena, Germany, and was used to measure optical path differences between adjacent materials. A Mach-Zehnder interferometer was used to shear and tilt a transmitted bright field image relative to itself. By overlaying the sheared image on the direct image, interference fringes were generated. Adjustments of the shear, tilt orientation, and tilt angle were used to orient and separate the fringes.

The instrument was used to measure the refractive index as follows: (Note: This is an index matching technique.)

1. A small portion of the film (approximately 0.5 millimeters×1.0 millimeters) was placed on a cleaned glass slide.
2. A drop of a refractive index fluid was placed over the film. The film and fluid were covered with a cleaned number 1½ coverslip.
3. The glass slide was then placed on the stage of the interference microscope. The sample was brought into crisp focus and aligned so that a straight edge of the film was oriented parallel to the horizontal cross-hair. (For consistency, the refractive index fluid should be in the upper half of the field of view and the film in the lower half of the field of view.)
4. Using the interferometer adjustments with white light illumination, a set of linear interference fringes oriented parallel to the vertical cross-hair with the zero order fringe aligned under the vertical cross-hair was obtained.
5. Again using the interferometer adjustments, the image of the sample was sheared relative to itself. For consistency, the sheared image was moved such that the interface between the refractive index fluid and the film was about ⅛ the field of view below the interface in the direct image.
6. If the film does not have the same refractive index as the fluid, the fringes will be off-set in the region between the fluid-film interface of the direct image and the fluid-film interface of the sheared image. If this was the case, then steps 1 through 5 are repeated using a different refractive index fluid. However, if the film and the fluid have the same refractive index, then the interference fringes will not be off-set.
7. Once the matching refractive fluid has been found, its refractive index should be verified using an Abbe refractometer. The Abbe refractometer, commercially available from Fisher Scientific Company, Pittsburgh, Pa., was used for measuring refractive index of liquids in the range of 1.2 to 1.7.

Test Procedure 5: Determination of Ceramer Composition Refractive Index

The refractive index of ceramer compositions as shown in Table 2 were measured on an Abbe refractometer, commercially available from Fisher Scientific, Pittsburgh, Pa.

Test Procedure 6: Determination of Ceramer Light Absorptivity

The degree of transparency of Ceramers 1–7 were determined by measuring the optical absorptivity ($a_0$). Excess uncured ceramer composition having a concentration of oxide particles in the range of 40 to 80 weight percent was added to the middle of a 2.54 centimeters by 5.08 centimeters quartz slide between two mylar spacer films each 0.127 millimeters thick. A second 2.54 centimeter by 5.08 centimeters quartz slide was placed above the assembly and used to squeeze the ceramer composition into a uniform layer. The percent light transmission was determined by curing the ceramer composition between the quartz slides. The curing of the ceramer composition took place in the presence of nitrogen, at a translation speed of 20 feet/minute through a UV curing station (Model #MC-6RQN, commercially available from Fusion System Corp., Rockville, Md., with a "D" bulb). In Ceramer 6, the sample assembly was allowed to dry in air at room temperature for 48 hours before curing. All light absorptivity measurements were make on a Perkin-Elmer Lambda 19 Spectrophotometer. The instrument was standardized against a cell comprising two quartz slides with no spacer, and the UV spectra was recorded in percent transmittance (% T). Percent transmittance readings were converted transmittance then to absorptivity ($a_0$), as follows: $a_0 = \log_{10}(1/T)/1$, where T is the transmittance expressed and 1 is the spacer thickness (in centimeters) (the concentration was assumed to be 1 for all samples). The absorptivity measurements (at 650 nanometers) are reported in Table 3. Note that apparent emission, a negative value of $a_0$, is possible due to the measurement conditions.

| Light absorptivity experimental parameters | |
|---|---|
| Scan Speed: | 240 nanometers/minute |
| Data Interval: | 1.0 nanometers |
| Slit Width: | 5.00 nanometers |
| Smooth: | 3.00 nanometers/data point |
| Mode: | % T |

Test Procedure 7: Determination of Colloid Light Absorptivity

An absorptivity test for colloids of Examples 3, 7, 9–11, and the ceramer composition of Ceramer 8 was developed to define some of the distinguishing features of the metal oxide particles of the present invention. The first step of the absorptivity test measures the dispersion stability or the relative resistance of particles to settling. Only colloids that are dispersion stable are part of the present invention and undergo a second test to determine the colloid light absorptivity. The absorptivity of the colloid was determined when the colloids included a metal oxide content typically in the range of about 10 weight percent metal oxide content to about 35 weight percent metal oxide content. The first step of the test was performed by taking 15 grams of a colloid (Examples 3, 7, 9–11), wherein the metal oxide particles were dispersed in either heptane, toluene, xylene, or 2-butanone and centrifuged at 2500 rpm for 10 minutes, using International Equipment Co., Model EXD, commercially available from Fisher Scientific Company, Pittsburgh, Pa., using rotor No. 259. After centrifugation, the sample was visually inspected for particle settling. If significant settling was observed, the sample was not considered part of the invention and consequently was not tested for light absorptivity. If the sample was substantially free of settling, the degree of transparency of the colloid was determined by measuring the optical absorptivity ($a_1$) of the colloid sample. All light absorptivity ($a_1$) measurements were made on a Perkin-Elmer Lambda 19 Spectrophotometer using a 1 millimeter pathlength quartz cuvet. The instrument was standardized against the pure solvent, and the UV spectra were recorded in transmission (% T) at 650 nanometers. Percent transmittance readings were then converted to transmittance then to absorptivity ($a_1$) as follows: $a_1 = \log_{10}(1/T)1c$, where T is the transmittance expressed, 1 is the pathlength in centimeters, and c is the concentration of metal oxide in grams of metal oxide per gram colloid. The absorptivity value ($a_1$) at 650 nanometers of each colloid, is reported in Table 3. Note that apparent emission, a negative value of $a_1$ is possible due to the measurement conditions.

Test Procedure 8: Determination of Crystallite Phase and Size

Powder samples of Examples 1–5 and 10 (particles or colloids) were prepared by allowing residual solvent in particle or colloid compositions to evaporate in air at room temperature for 18 hours. The powders were then placed under vacuum (ca. $10^{-1}$ Torr) for 18 hours at room temperature.

By X-ray diffraction, the crystalline phase and crystallite diameter of metal oxide particles were determined using a Philips vertical diffractometer, commercially available from Philips Electronic Instruments Company, Mahwah, N.J. For testing purposes, the diffractometer was fitted with variable entrance slits, a fixed 0.2 degree receiving slit, a graphite diffracted beam monochromator, and a proportional detector for registry of the scattered radiation. A sealed copper target X-ray source was used. Generator settings were 45 kV and 35 mA.

Each sample was prepared as either a dried ethanol slurry on a glass substrate or as a thin layer powder on double coated tape supported by a glass substrate. Survey step scans were conducted from 5 to 80 degrees (2θ) using a 0.04 degree step interval and 4 second counting time. Identification of the crystalline phases of the metal oxide particles was achieved by comparison (as described in Harold P. Klug and Leroy E. Alexander, *X-ray Diffraction Procedures For Polycrystalline and Amorphous Materials,* John Wiley & Sons, New York 1954) of the observed diffraction maxima to the patterns present in the International Centre for Diffraction Data powder data file (International Centre for Diffraction Data, 12 Campus Boulevard, Newton Square, Pa.). The width of the anatase (1 0 1) maximum was determined by profile fitting using a Gaussian peak shape model and linear background. The apparent crystallite size was calculated using the Scherrer equation and the anatase (1 0 1) peak width after correction for instrumental broadening (as described in Harold P. Klug and Leroy E. Alexander, *X-ray Diffraction Procedures For Polycrystalline and Amorphous Materials,* John Wiley & Sons, New York, 1954, and P. Scherrer, *Göttinger Nachrichten,* 2, p. 98 1918).

Test Procedure 9: Determination of Anatase Quantification

The amount of crystalline anatase (tetragonal crystal structure) present in the particles of Examples 2, 3, and 5 were determined using a Philips vertical diffractometer, commercially available from Philips Electronic Instruments Company, Mahwah, N.J., having variable entrance slits, a fixed 0.2 degree receiving slit, a graphite diffracted beam monochromator, and a proportional detector for registry of the scattered radiation. A sealed copper target X-ray source was used. The generator settings were 45 kV and 35 mA.

Each particle sample was prepared as a 50:50 mixture by weight with tungsten metal and scanned between 20 and 52 degrees (2θ) using a 0.05 degree step interval and 12 second counting time. Peak areas for the anatase (1 0 1), (1 0 3), (0 0 4), (1 1 2), and (2 0 0) maximum and tungsten (1 1 0) maximum were determined by profile fitting the observed data. A Gaussian peak shape model and linear background were employed for profile fitting. The ratio ($R_{exp}$) of anatase peak area ($A_{anatase}$), taken as the sum of the individual contributions indicated above, to tungsten ($A_W$) peak area, were calculated for each unknown. A reference anatase standard, commercially available as Catalogue #23,203-3 from Aldrich Chemical, Milwaukee, Wis., was also scanned to provide a similar reference value ($R_{std}$). The weight percent of anatase form in the crystalline metal oxide particles of the present invention were calculated by the instrument using the ratio of $R_{exp}$ to $R_{std}$ as follows:

| | |
|---|---|
| $A_{anatase} = A_{(101)} + A_{(103)} + A_{(004)} + A_{(112)} + A_{(200)}$ | Sum of individual anatase peak areas |
| $A_W$ | Area of tungsten (110) peak |
| $R_{exp} = A_{anatase}/A_W$ | Ratio of anatase peak area to tungsten peak area for unknown |
| $R_{std} = A_{anatase\text{-}std}/A_{W\text{-}std}$ | Ratio of anatase peak area to tungsten peak area for standard anatase sample |
| Wt. % anatase =0 $(R_{exp}/R_{std}) \times 100$ | Weight percent crystalline anatase taken as ratio of $R_{exp}$ to $R_{std}$ |

An analogous calculation was done for barium titanate (Example 4) by reference to a barium titanate (BT-8, commercially available from Cabot Performance Materials, Boyertown, Pa.): titanium carbide.

Characteristics of Ceramers and Particles of the Present Invention

Using Test Procedures 1 and 2, the metal oxide content of the colloids and ceramers were determined. The results are shown in Table 1.

TABLE 1

| SAMPLE | WEIGHT PERCENT METAL OXIDES |
|---|---|
| Example | |
| 3 (colloid) | 34.53 |
| 7 (colloid) | 34.95 |
| 8 (colloid) | 34.53 |
| 9 (colloid) | 31.11 |
| 11 (colloid) | 10.17 |
| Ceramer | |
| 1 | 54.09 |
| 2 | 51.04 |
| 3 | 54.03 |
| 4 | 42.14 |
| 5 | 43.24 |
| 6 | 79.49 |
| 7 | 42.60 |
| 8 | 45.98 |

Table 1 illustrates some colloids of the present invention having a metal oxide content of approximately 10 to 35 weight percent. In addition, some ceramers of the present invention have a metal oxide content of approximately 40 to 80 weight percent.

Using Test Procedures 3, 4, and 5, the refractive index of ceramers and ceramer compositions made from the metal oxide particles of the present invention were determined. The results are shown in Table 2.

TABLE 2

| | Refractive Index Measurement | | |
|---|---|---|---|
| SAMPLE | CERAMER COMPOSITION | CERAMER | POLYMER PRECURSOR |
| Ceramer | | | |
| 1 | 1.65 | 1.67 | 1.43 |
| 2 | 1.66 | 1.68 | 1.46 |
| 3 | 1.69 | 1.70 | 1.50 |

TABLE 2-continued

Refractive Index Measurement

| SAMPLE | CERAMER COMPOSITION | CERAMER | POLYMER PRECURSOR |
|---|---|---|---|
| 4 | 1.58 | 1.62 | 1.35 |
| 5 | 1.61 | NM | NM |
| 6 | NM | 2.01 | 1.56 |
| 7 | 1.62 | 1.65 | Mixture of Acrylates |
| 8 | 1.68 | NM | 1.54 |

NM = Not Measured

Table 2 illustrates that ceramer compositions and ceramers made from the particles of the present invention increase the refractive indexes of the original polymer precursors (substantially free of metal oxide particles) that were used to make the ceramer compositions and the ceramers of the present invention. For example, the addition of metal oxide particles to 4,6-dibromo-2-sec-butyl phenyl acrylate of Ceramer 6 increased the refractive index of the polymer precursor substantially free of metal oxide particles from 1.56 to 2.01 by the addition of metal oxide particles. The ceramer compositions all had a higher refractive index than the polymer precursors used to make the ceramer compositions. In addition, the ceramers of the present invention have a refractive index in the range of about 1.62 to about 2.01. The refractive indexes of colloids of the present invention were not taken since such measurements are concentration dependent and may vary with the evaporation of solvent.

Using Test Procedures 6 and 7, the absorptivity of ceramers and colloids made from the particles of the present invention were determined. The results are shown in Table 3.

TABLE 3

| SAMPLE | ABSORPTIVITY |
|---|---|
| Example | |
| 3 | 0.492 ($a_1$) |
| 7 | −0.649 ($a_1$) |
| 9 | 0.510 ($a_1$) |
| 10 | 1.170 ($a_1$) |
| 11 | 2.720 ($a_1$) |
| Ceramer | |
| 1 | 0.012 ($a_0$) |
| 2 | 0.540 ($a_0$) |
| 3 | −0.249 ($a_0$) |
| 4 | −1.060 ($a_0$) |
| 5 | 3.740 ($a_0$) |
| 6 | 8.43 ($a_0$) |
| 7 | 1.376 ($a_0$) |
| 8 | 2.955 ($a_1$) |

Table 3 demonstrates colloids having approximately 10 to 35 weight percent of metal oxide particles of the present invention have absorptivity ($a_1$) measurements in the range of −0.649 to about 2.955. The ceramers of the present invention have absorptivity ($a_0$) measurements in the range of about −1.060 to about 8.43. ($a_0$) refers to absorptivity measured using Test Procedure 6 and ($a_1$) refers to absorptivity measured using in Test Procedure 7.

Using Test Procedures 8 and 9, the crystalline diameter and percent crystallinity of the metal oxide particles of Examples 1–5 and 10 were determined. The results are shown in Table 4.

TABLE 4

| SAMPLE | CRYSTALLITE DIAMETER | PERCENT CRYSTALLINITY | CRYSTAL-LINITY INDEX |
|---|---|---|---|
| Example | | | |
| 1 | 7.5 | NM | NM |
| 2 | 8.4 | 68 | 8.1 |
| 3 | 6.3 | 60 | 9.5 |
| 4 | 6.0 | 55 | 9.1 |
| 5 | 7.8 | 63 | 8.1 |
| 10 | 10.6 | NM | NM |

NM = Not Measured

Table 4 illustrates the crystallite diameters of the metal oxide particles of Examples 1–5 and 10 were in the range of about 6.0 to about 10.6 nanometers. The percent crystallinity of the metal oxide particles of Examples 2–5 was in the range of approximately 55 to 68. The crystallinity ratio is defined as the ratio of percent crystallinity to crystallite diameter. The crystallinity ratios of the samples of the present invention were in the range of about 8.1 to about 9.5.

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

What is claimed is:

1. A ceramer article comprising inorganic particles dispersed in an organic matrix, said inorganic particles comprising:

(a) titanium based oxide particles having a dispersing aid attached thereto and having a degree of crystallinity of greater than 55 percent;

(b) a crystallite diameter greater than about 4 nanometers and less than about 20 nanometers; and (c) an absorptivity of less than about 3.00 as a colloid.

2. The ceramer article of claim 1, wherein the organic matrix is prepared from precursors substantially free of an agent selected from the group consisting of water, alcohols, and combinations thereof.

3. The ceramer article of claim 1, wherein the organic matrix is prepared from polymer precursors selected from the group consisting of molecules possessing ethylenically unsaturated polymerizable olefins, and combinations thereof.

4. The ceramer article of claim 1, wherein the organic matrix is a polyacrylate.

5. The ceramer article of claim 1, having a geometric shape.

6. The ceramer article of claim 5, wherein the geometric shape includes a sphere, square, cylinder, pyramid, or cone.

7. The ceramer article of claim 1 having an irregular shape.

8. The ceramer article of claim 1, wherein the article is a light management device.

9. The ceramer article of claim 1 wherein the ceramer has a refractive index greater than about 1.6.

10. The ceramer article of claim 1, wherein the article has a refractive index greater than about 1.6 and less than about 2.01.

11. The ceramer article of claim 1, wherein the organic matrix is prepared from a composition comprising at least one polymer precursor curable by a free radical mechanism.

12. A coated article comprising a substrate with a surface attached to at least one layer of a coating wherein the substrate, the coating, or both, comprise a ceramer including inorganic particles dispersed in an organic matrix, said organic particles comprising:

(a) titanium based oxide particles having a dispersing aid attached thereto and having a degree of crystallinity of greater than 55 percent;

(b) a crystallite diameter greater than about 4 nanometers and less than about 20 nanometers; and (c) an absorptivity of less than about 3.00 as a colloid.

13. The coated article of claim 12, wherein at least one layer of coating comprises the ceramer.

14. The coated article of claim 12, wherein the at least one layer of coating has a refractive index greater than about 1.6.

15. The coated article of claim 12, wherein the substrate comprises the ceramer.

16. The coated article of claim 12, wherein the substrate and the coating comprise the ceramer.

17. The coated article of claim 12, wherein the organic matrix is prepared from a composition comprising at least one polymer precursor curable by a free radical mechanism.

18. The coated article of claim 12, wherein the organic matrix is prepared from at least one polymer precursor selected from the group of molecules possessing ethylenically unsaturated polymerizable olefin, and combinations thereof.

19. The coated article of claim 12, wherein the organic matrix is polyacrylate.

20. The coated article of claim 12, wherein the substrate is selected from the group consisting of glass, plastic, and metal.

21. The coated article of claim 12, wherein the substrate is selected from the group consisting of lenses, sheets, fibers, prisms, computer screens, and CRT face plates.

* * * * *

UNITED STATES PATENT AND TRADEMARK OFFICE
CERTIFICATE OF CORRECTION

PATENT NO.    : 6,432,526 B1
DATED         : August 13, 2002
INVENTOR(S)   : Arney, David S.

It is certified that error appears in the above-identified patent and that said Letters Patent is hereby corrected as shown below:

Title page,
Item [62], Related U.S. Application Data, "Division" should be shown as
-- Divisional --
Item [56], References Cited, U.S. PATENT DOCUMENTS, "5,371,796 A" should be shown as -- 5,372,796 A --
FOREIGN PATENT DOCUMENTS, "WO 963157" should be shown as
-- WO 96/3157 --
OTHER PUBLICATIONS, "Generation of wet" reference, "nanopticles" should be shown as -- nanoparticles --

Column 1,
Line 55, "through" should be shown as -- thought --

Column 2,
Line 28, "aggregated" should be shown as -- aggregates --

Column 3,
Line 4, "substiochiometric" should be shown as -- substoichiometric --
Line 36, "board" should be shown as -- broad --
Line 66, "Substiochiometric" should be shown as -- Substoichiometric --
Line 66, "of" should be shown as -- or --

Column 4,
Line 1, delete "(" before "Ti"
Line 1, "substiochiometric" should be shown as -- substoichiometric --

Column 7,
Line 1, "acetonacetate" should be shown as -- acetoacetate --
Line 42, "dispersion" should be shown as -- dispersions --

Column 8,
Line 20, "$a_1=\log_{10}(I/T)lc$" should be shown as -- $a_1=\log_{10}(I/T)/lc$ --

Column 10,
Line 20, "fact" should be shown as -- face --

Column 12,
Line 53, "Aerodisc" should be shown as -- Acrodisc --

UNITED STATES PATENT AND TRADEMARK OFFICE
CERTIFICATE OF CORRECTION

PATENT NO. : 6,432,526 B1
DATED : August 13, 2002
INVENTOR(S) : Arney, David S.

It is certified that error appears in the above-identified patent and that said Letters Patent is hereby corrected as shown below:

Column 13,
Line 12, "." should be shown as -- , --

Column 14,
Line 41, "60º" should be shown as -- 68º --

Column 15,
Line 24, "of" should be shown as -- on --

Column 16,
Line 19, "22.8" should be shown as -- 2.28 --

Column 18,
Line 55, "4,6-dibromo-2-secbutylphenylacrylate" should be shown as
-- 4,6-dibromo-2-sec-butylphenylacrylate --

Column 19,
Line 11, "to" should be shown as -- and --

Column 20,
Line 36, "and" should be shown as -- an --

Column 23,
Line 60, "maximum" should be shown as -- maxima --

Column 24,
Line 14, "Wt. % anatase =0 ($R_{exp}/R_{std}$" should be shown as -- Wt. % anatase = ($R_{exp}/R_{std}$ --
Line 36, Table 1, insert between 9 and 11, -- 10 (colloid)   11.11 --

UNITED STATES PATENT AND TRADEMARK OFFICE
CERTIFICATE OF CORRECTION

PATENT NO. : 6,432,526 B1
DATED : August 13, 2002
INVENTOR(S) : Arney, David S.

It is certified that error appears in the above-identified patent and that said Letters Patent is hereby corrected as shown below:

Column 27,
Line 5, "organic" should be shown as -- inorganic --

Signed and Sealed this

Twenty-third Day of December, 2003

JAMES E. ROGAN
*Director of the United States Patent and Trademark Office*